US011913275B2

(12) United States Patent
Torosian et al.

(10) Patent No.: US 11,913,275 B2
(45) Date of Patent: Feb. 27, 2024

(54) FOLDABLE GATE

(71) Applicant: Baby Delight, Inc., Cumberland, RI (US)

(72) Inventors: Steve Torosian, York, ME (US); Mark Adamowicz, Sutton, MA (US); Jason Macari, Cumberland, RI (US)

(73) Assignee: BABY DELIGHT, INC., Cumberland, RI (US)

( * ) Notice: Subject to any disclaimer, the term of this patent is extended or adjusted under 35 U.S.C. 154(b) by 627 days.

(21) Appl. No.: 17/119,573

(22) Filed: Dec. 11, 2020

(65) Prior Publication Data

US 2021/0180393 A1 Jun. 17, 2021

Related U.S. Application Data

(60) Provisional application No. 62/947,521, filed on Dec. 12, 2019.

(51) Int. Cl.
*E06B 3/48* (2006.01)
*E06B 11/04* (2006.01)

(52) U.S. Cl.
CPC .............. *E06B 3/481* (2013.01); *E06B 11/04* (2013.01)

(58) Field of Classification Search
CPC .......... E06B 3/481; E06B 11/04; E06B 9/522; E06B 1/045
See application file for complete search history.

(56) References Cited

U.S. PATENT DOCUMENTS 5,483,779 A * 1/1996 Crawford ................ G09F 15/00 52/645
5,531,258 A * 7/1996 Poulson .................. F16B 7/105 256/DIG. 1
5,575,113 A * 11/1996 Huang ...................... E06B 9/02 49/55

(Continued)

FOREIGN PATENT DOCUMENTS

EP 1788186 A2 5/2007
EP 3683397 A1 * 7/2020 ............. E06B 1/045

OTHER PUBLICATIONS

First Office Action from Chinese Corresponding Application 202011463608.X dated Jun. 1, 2023 English translation attached.

*Primary Examiner* — Beth A Stephan
(74) *Attorney, Agent, or Firm* — Grossman, Tucker, Perreault & Pfleger, PLLC

(57) ABSTRACT

The present disclosure is generally directed to a gate having a frame that can fold and collapse into a compact profile for purposes of storage and travel. In an embodiment, a gate consistent with the present disclosure includes a plurality of frame members coupled together via hinged couplers. The hinged couplers provide an in-use configuration whereby the frame members occupy substantially the same plane and form a picture-frame/rectangular shape. Preferably, a foldable material such as mesh at least partially surrounds each frame member and extends between the frame members to form a sidewall. The hinged couplers include at least a first hinged coupler configured to allow for out-of-plane rotation about a first axis to fold the frame members relative to each other in a clamshell fashion, and at least a second hinged coupler to allow for in-plane rotation about a second axis to collapse the frame members.

12 Claims, 8 Drawing Sheets

(56) References Cited

U.S. PATENT DOCUMENTS

| | | | | | |
|---|---|---|---|---|---|
| 5,657,809 | A * | 8/1997 | Longoria | E06B 9/04 | 160/369 |
| 5,704,164 | A * | 1/1998 | Huang | E06B 9/02 | 49/55 |
| 7,422,048 | B2 * | 9/2008 | Andersen | E06B 9/00 | 49/55 |
| 7,658,220 | B2 * | 2/2010 | Yates | E06B 9/04 | 49/55 |
| 9,091,113 | B2 * | 7/2015 | Pilgrim | E06B 9/06 | |
| 11,174,675 | B1 * | 11/2021 | Flannery | E06B 9/06 | |
| 11,466,513 | B2 * | 10/2022 | Büdenbender | E06B 1/045 | |
| 2015/0330142 | A1 * | 11/2015 | Pilgrim | E05D 3/02 | 160/374 |
| 2022/0018186 | A1 * | 1/2022 | Büdenbender | E06B 9/24 | |

* cited by examiner

FOLDABLE GATE

RELATED APPLICATIONS

The present application claims the benefit of U.S. Provisional Patent Application Ser. No. 62/947,521 filed on Dec. 12, 2019, which is fully incorporated herein by reference.

TECHNICAL FIELD

This specification relates to safety gates that bridge between passageways, and in particular, to a safety gate with a foldable frame to transition to a storage/travel configuration.

BACKGROUND INFORMATION

Safety gates, commonly referred to as baby gates, bridge between passageways to keep children and pets contained within a specific area, or to keep children and pets from entering certain areas as the case may be. So-called "portable" baby gates can include a mechanism that reduces the overall footprint of the same for purposes of storage/travel. However, such portable baby gates tend to require a significant amount of storage space even when in the storage/collapsed configuration. Moreover, such baby gates often remain extended during travel/storage as the amount of time and user frustration to collapse and re-deploy a baby gate often outweighs the benefits of fully collapsing the same.

BRIEF DESCRIPTION OF THE DRAWINGS

These and other features advantages will be better understood by reading the following detailed description, taken together with the drawings wherein.

DETAILED DESCRIPTION

Existing baby gates remain challenging to store and travel with in general. Baby gates that are marketed as "portable" often include limited storage/travel features. For instance, some gates provide the ability to collapse/retract to a minimum passageway width, or are constructed from relatively light-weight material. However, such existing portable gates remain relatively awkward to carry/store, and moreover, remain incapable of being stored within space-constrained spaces such as backpacks, suitcases, and overhead bins on a plane.

Thus, the present disclosure is generally directed to a safety gate, also referred to herein as gate device or simply a gate, having a gate frame that can fold and collapse into a compact profile for purposes of storage and travel. In an embodiment, a gate consistent with the present disclosure includes a plurality of frame members coupled together via hinged couplers to provide a gate frame, and preferably, a rectangular gate frame. The hinged couplers preferably provide an in-use configuration whereby the frame members occupy substantially the same plane and form a picture-frame/rectangular shape. Preferably, a foldable material such as mesh at least partially surrounds each frame member and extends between the frame members to form a sidewall. The hinged couplers also preferably include at least a first hinged coupler configured to allow for out-of-plane rotation about a first axis to fold the frame members relative to each other in a clamshell fashion, and at least a second hinged coupler to allow for in-plane rotation about a second axis to collapse the gate frame. The hinged couplers therefore allow the gate frame 102 to transition into a storage configuration whereby the frame members rotate about two different rotational axis to ultimately extend substantially parallel relative to each other for ease of storage and travel.

FIGS. 1-5 show an example gate 100 consistent with an embodiment of the present disclosure. As shown, the gate 100 includes a plurality of frame members (also referred to herein as tubular frame members) shown collectively as gate frame 102 (which may also be referred to herein as a frame) and individually as frame members 102-1, 102-2, 102-3, and 102-4, a plurality of hinged couplers 104-1, 104-2, 106-1, 106-2, a fabric sidewall 108, and a plurality of optional adjustable pressure members 110. As shown, the gate frame 102 preferably includes at least four frame members.

Figure 1:
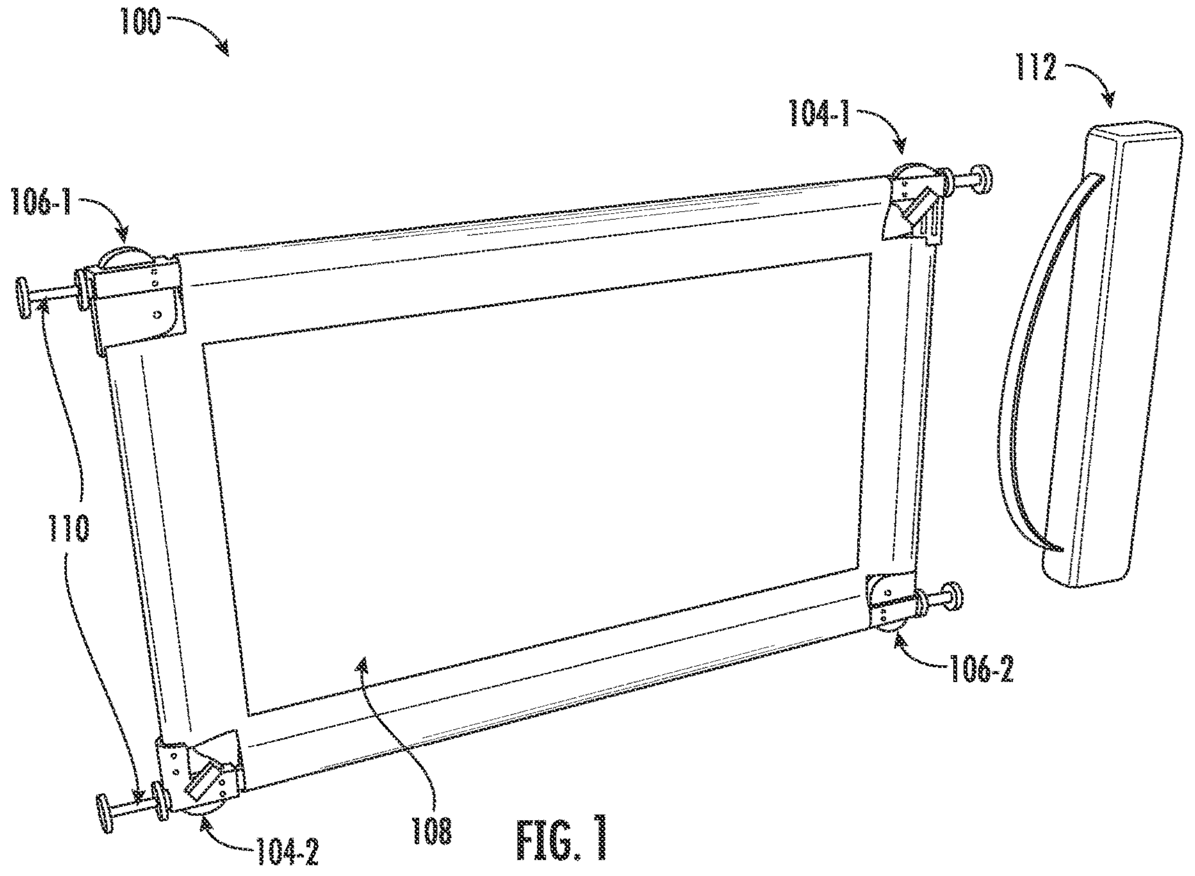
FIG. 1 shows an example gate consistent with the present disclosure.

Each of the frame members can have a rectangular profile, e.g., as shown in FIG. 1, or have other shapes/profiles including rounded, triangular, oblong, and/or octagonal. The frame members of the gate frame 102 preferably comprise a metal, metal alloy, plastic, or any other suitably rigid material. Each of the frame members of the gate frame 102 can be formed from the same or different material and preferably include a similar structure and profile.

The structure of each frame member of the gate frame 102 can include a hollow body to advantageously reduce overall weight, or can be solid depending on a desired configuration. As discussed below, having hollow frame members for the gate frame 102 also allows for having telescoping capabilities, whereby a frame member with a first diameter at least partially receives and surrounds an inner frame member with a second diameter that is smaller than the first diameter. Accordingly, the example gate 100 shown in FIGS. 1-5 includes telescoping frame members, e.g., frame members 102-1, 102-3 that can extend/telescope to adjustably increase or decrease the overall width of the gate 100 to accommodate openings of various dimensions.

The gate 100 further includes optional adjustable pressure members 110, which may also be referred to herein as simply pressure members. The optional adjustable pressure members 110 preferably include a body in the form of a threaded screw/bolt and an adjustable head affixed to one end of the body. The optional adjustable pressure members 110 then engage a threaded opening in an associated hinged coupler.

Figure 2:
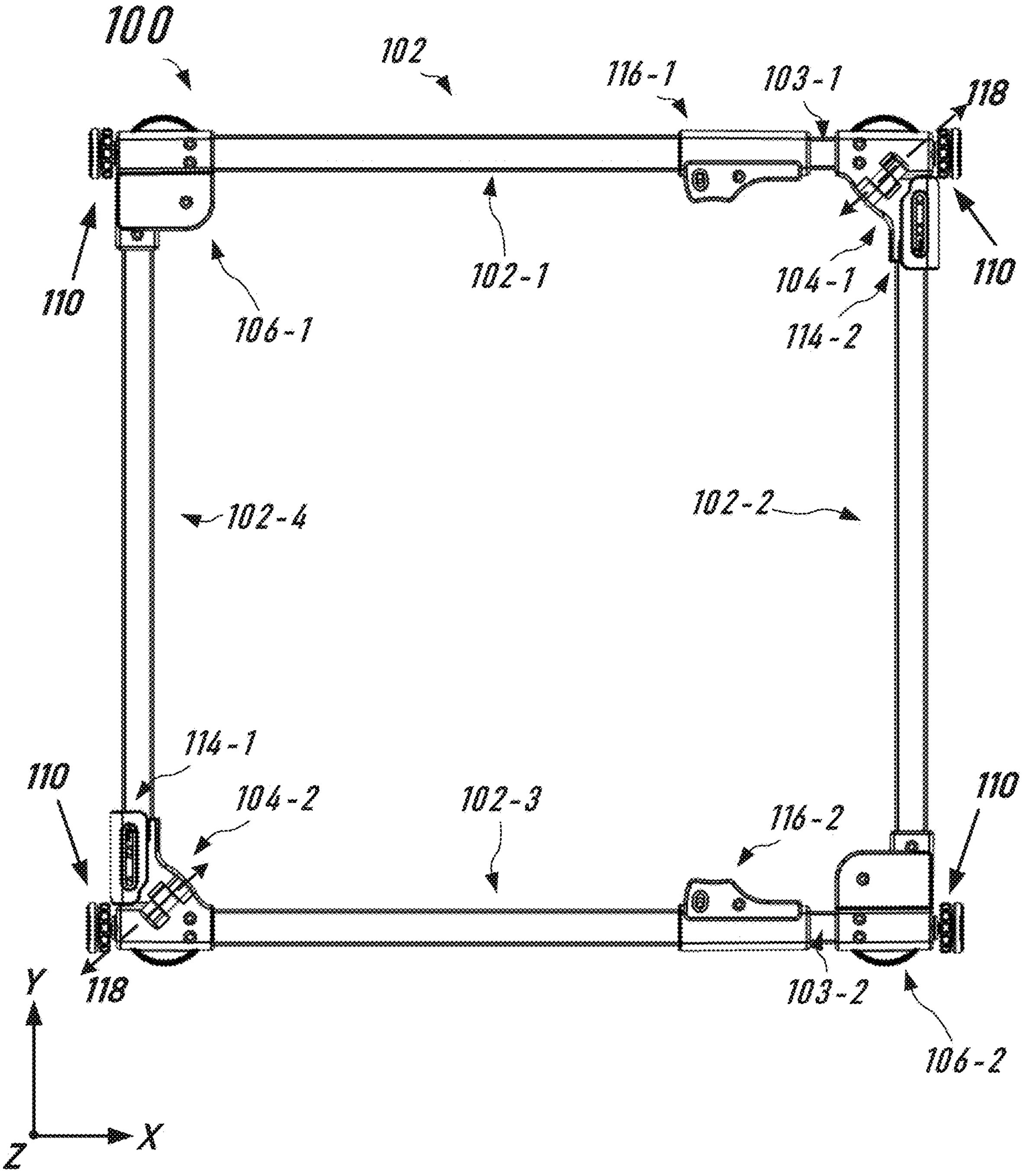
FIG. 2 shows an example frame for use by the gate of FIG. 1 in accordance with an embodiment of the present disclosure.

As shown more clearly in FIG. 2, the pressure members 110 preferably extend coaxially with the longitudinal axis of the first and third members 102-1, 102-3 such that the pressure members 110 provide an adjustable extension of the first and third members 102-1, 102-3 to permit a user to increase/decrease force applied to a doorway/opening by the gate 100. As discussed below, a user can also optionally engage telescoping members to perform more "coarse" grain adjustment of the gate 100 during installation/removal.

In an embodiment, the fabric sidewall 108 comprises natural or synthetic fabric materials such as cotton, vinyl, polyester, and preferably, materials naturally resistant or otherwise treated to prevent wrinkling, water absorption, and/or staining such as polyester, nylon, acrylic and olefin, or a combination thereof. In addition, the fabric sidewall 108 can include a mesh (e.g., as shown in FIG. 1) to promote air flow and allow light to pass therethrough. Preferably, the fabric sidewall 108 allows for at least 80 percent of incident light to pass therethrough. The fabric sidewall 108 can optionally include hook and loop sections to permit a user to remove the fabric sidewall 108 from the gate frame 102 for cleaning purposes.

As further shown in FIG. 1, the fabric sidewall 108 at least partially surrounds each of the frame members of the gate frame 102. The fabric sidewall 108 thus advantageously obscures from view substantially all of the frame members and the associated frame locking devices to increase aesthetic appeal, and importantly, also to reduce the risk of pets/children coming into contact with the same and inadvertently disengaging frame locks.

The fabric sidewall 108 can also include the aforementioned hook and loop sections, or other tensioning feature such a strap, to allow a user to increase tension between the fabric sidewall 108 and the gate frame 102 to provide additional structural integrity when in the in-use configuration.

As discussed in greater detail below, the gate 100 can be collapsed/folded into a storage configuration whereby the gate 100 has a compact footprint for portability (See, e.g., FIG. 5) and/or to decrease the space necessary to store the gate 100 when not in use (e.g., within an automobile trunk, closet, drawer).

Figure 3:
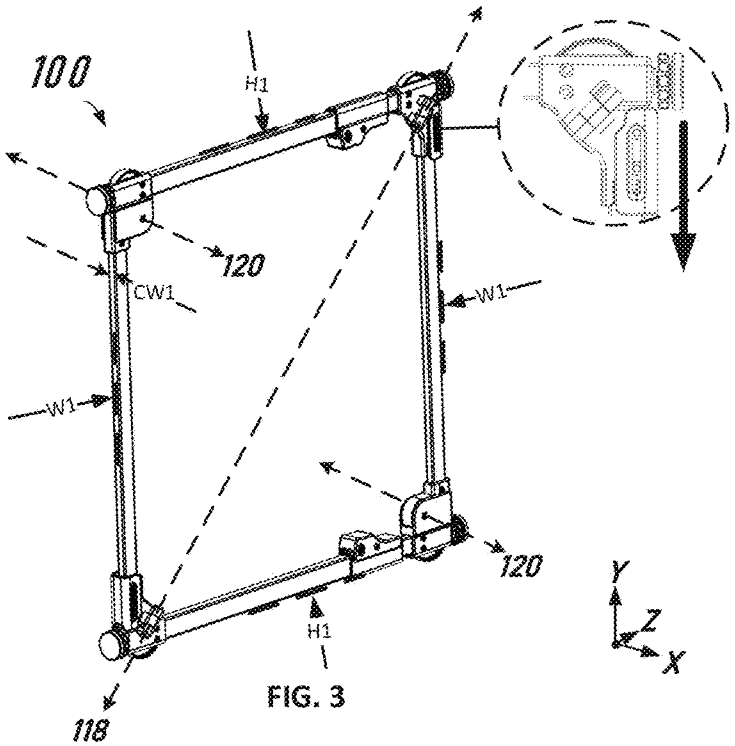
FIG. 3 shows another perspective view of the frame of FIG. 2 in accordance with an embodiment of the present disclosure.

As shown in FIG. 3 the frame members of the gate 100 provide a frame with an overall height H1, and a minimum overall width W1 when in the extended/in-use configuration. As noted above, the gate 100 may be extended/widened by a user such that the overall width of the gate 100 can be extended between the minimum overall width W1 and a maximum overall width. Preferably, the maximum overall width of the gate is at least 10% greater than the minimum overall width W1, and more preferably, at least 25% greater than the minimum overall width W1.

Storage case/sleeve 112 demonstrates one example of the compact footprint achieved by the gate 100 in the collapsed/folded configuration. In this preferred example, and as is shown more clearly in FIG. 5, the gate 100 is folded and collapsed to an overall height of H2, an overall width of W2 and an overall cross-wise width of CW2. Preferably, the overall width W2 of the gate 100 in the collapsed/folded configuration is substantially equal to the overall minimum width W1 of the gate frame of the gate 100 in the in-use/unfolded configuration (See FIG. 3).

On the other hand, the overall height H2 of the gate 100 in the collapsed/folded configuration is preferably 50% less than the overall height H2 of the gate frame 102 of the gate 100 in the in-use/unfolded configuration, and more preferably, at least 90% less. Accordingly, the ratio over the overall height H1 in the in-use/unfolded configuration relative to the overall height H2 in the collapsed/folded configuration is preferably between 2:1 to 10:1. In one preferred example, the ratio over the overall height H2 in the collapsed/folded configuration relative to the overall height H1 in the in-use configuration is 50±10%. The compact footprint of the gate 100 in the collapsed/folded configuration also preferably includes an overall cross-wise width CW2 (See FIG. 5) that is preferably no greater than 2-3 times greater than the cross-wise CW1 of the frame members (See FIG. 3) of the gate frame 102.

In one non-limiting preferred example, the overall height H1 is equal to 27 inches, the maximum overall width W1 is equal to 48 inches, and the overall cross-wise width CW1 is 2.25 inches when the gate frame 102 is in the in-use configuration (See FIG. 3). In this preferred example, the overall height H2 is equal to 5 inches, the overall width W2 is equal to 27 inches and the overall cross-wise width CW2 is equal to 2.25 inches when the gate frame 102 is in the storage configuration (See FIG. 5).

In another non-limiting preferred example, the overall height H1 is equal to 34 inches, the maximum overall width W1 is equal to 60 inches, and the overall cross-wise width CW1 is 2.25 inches when the gate frame 102 is in the in-use configuration (See FIG. 3). In this preferred example, the overall height H2 is equal to 5.25 inches, the overall width W2 is equal to 34 inches and the overall cross-wise width CW2 is equal to 2.25 inches when the gate frame 102 is in the storage configuration (See FIG. 5).

In another non-limiting preferred example, the overall height H1 is equal to 39 inches, the maximum overall width W1 is equal to 72 inches, and the overall cross-wise width CW1 is 2.25 inches when the gate frame 102 is in the in-use configuration (See FIG. 3). In this preferred example, the overall height H2 is equal to 6.5 inches, the overall width W2 is equal to 39 inches and the overall cross-wise width CW2 is equal to 2.25 inches when the gate frame 102 is in the storage configuration (See FIG. 5).

FIG. 2 illustrates the gate 100 without the fabric sidewall 108 for purposes of showing additional aspects and features of the gate 100. In particular, the embodiment of FIG. 2 shows the second and third frame members 102-1, 102-3 having a telescoping arrangement. The overall dimensions, e.g., height and width, of the second and third frame members 102-1, 102-3 measures greater than that of the corresponding dimensions of the first and second extendable portions 103-1, 103-2, respectively.

Thus, the second and third frame members 102-1, 102-3 preferably provide a cavity capable of receiving at least a portion of the first and second extendable members 103-1, 103-2, respectively, and allow a user-supplied force, e.g., applied along the X axis, to increase/decrease the overall width of the gate 100. Stated differently, the first and third frame members 102-1, 102-3 and corresponding first and second extendable sections 103-1, 103-2 provide telescoping frame members/arrangements to allow a user to selectively set the overall width of the gate 100 during use.

Continuing on, the gate 100 includes first and second frame locks 116-1, 116-2 to switchably lock and unlock the first and second extendable portions 103-1, 103-2 respectively. Each of the first and second frame locks 116-1, 116-2 at least partially surround and securely couple to an associated frame member (e.g., 102-1, 102-3). The first and second frame locks 116-1, 116-2 can include a locking arrangement, such as a detent mechanism, to prevent movement of the frames 102-1, 102-3 relative to their respective extendable portions along the X axis, for example. Thus, the first and second frame locks 116-1, 116-2 allow a user to increase/decrease the overall width of the gate 100 via the telescoping frame members. The gate 100 can include a plurality of predefined extents based on, for instance, openings provided along the extendable portions 103-1, 103-2 that engage with the detent of the first and second frame locks 116-1, 116-2, as discussed in greater detail below.

As further shown in FIG. 2, the gate 100 includes a plurality of hinged couplers to couple frames together and provide rigidity when in-use, e.g., when bridged between opposite sides of a door casing/room opening. The rigidity provided by the hinged couplers in this so-called "in-use" configuration of the gate 100 reduces or otherwise minimizes warping of the gate 100 under load to ensure that each of the frame members of the gate frame 102 remain substantially within a common plane under load. Thus, the in-use configuration permits the gate 100 to bridge between sidewalls/surfaces of a doorway/opening and resist buckling/collapsing/deforming to maintain structural integrity when exposed to loads commonly introduced by pets, children, and accidental contact in general.

Of course, the risk of gate displacement and/or injury to people/pets substantially decreases when the gate 100 gets fully transitioned from a storage configuration (as shown and described below) to the in-use configuration shown in FIG. 2. The in-use configuration includes, preferably, the hinged couplers fully opened to a position that encounters associated integrated stops and the engagement of optional first and second sliding locks 114-1, 114-2. In addition, the in-use configuration can further include extending pressure members 110 and/or the telescoping frame members 102-1, 102-3 based on user-supplied forces to increase/decrease overall width of the gate 100 to securely bridge between sidewalls of a doorway/opening.

Preferably, the gate 100 includes a nominal expected loading of at least about 1-300 pounds, although other nominal load targets are within the scope of this disclosure. For instance, in instances where the gate 100 aims to withstand loads of up to 300 pounds or more applied against either side (i.e., force applied against member(s) and/or the fabric sidewall 108) materials for the members and hinge joints and/or fabric sidewall 108 can be selected to maximize rigidity. For instance, the gate 100 can include frame members formed or otherwise reinforced with metal such as steel, aluminum, titanium, or a suitably rigid plastic. In addition, the gate 100 can include additional features to secure the same into a doorway using, for instance, hooks, slots, or other suitable devices that can securely couple the gate 100 into an opening for use as a barrier.

As is shown, the plurality of hinged couplers include a first set/pair of hinged couplers (104-1, 104-2) and a second set/pair of hinged couplers (106-1, 106-2). Each of the plurality of hinged couplers include a body that defines first and second openings disposed substantially transverse with each other to receive and couple to the ends of frame members 102. Thus, the frame members extend substantially transverse relative to each other, and preferably at substantially a right angle (e.g., 90±5 degrees), when an end of each gets inserted at least partially into the openings of the hinged couplers.

Continuing on, the first pair of hinged couplers (104-1, 104-2) that define at least a portion of the rectangular profile of the gate are preferably diagonally disposed relative to each other and form opposite corners of the gate 100. To this end, an imaginary straight line drawn across the gate 100 (e.g., along the line shown generally at 118) intersects with both of the hinged couplers 104-1, 104-2. Likewise, the second pair of hinged couplers 106-1, 106-2 also define at least a portion of the rectangular profile of the gate 100 and are also preferably diagonally disposed relative to each other and form the other corners of the gate 100.

Figure 6:
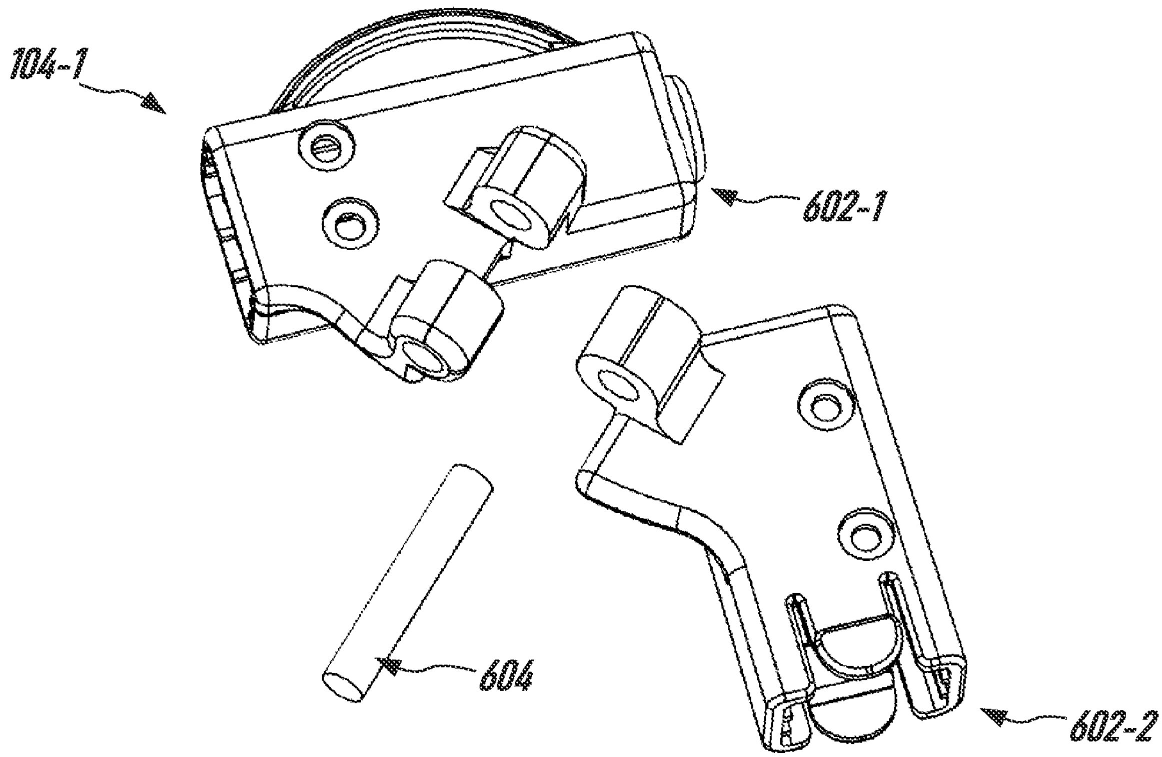
FIG. 6 shows an example hinged coupler consistent with embodiments of the present disclosure.

Structure and function of the first and second pairs of hinged couplers forming the gate 100 will now be discussed in turn. The first pair of hinged couplers (104-1, 104-2) each include a segmented/multi-portion body, wherein the body segments/portions define knuckles/projections that interlock with each other to allow for rotation about a first rotational axis 118 (See FIG. 6). For instance, as shown in FIG. 6, the hinged coupler 104-1 preferably includes first and second body portions 602-1, 602-2. The first and second body portions each provide an interlocking portion at one end that are configured to couple to each other and form a through hole. A pin 604 can extend through the through hole formed by the interlocking portions to allow for the first and second body portions to rotate relative to each other. The first and second body portions 602-1, 602-2 further provide an opening at a second end. The opening of each of the first and second body portions 602-1, 602-2 is preferably configured to receive and couple to respective frame members of the gate frame 102.

Figure 8:
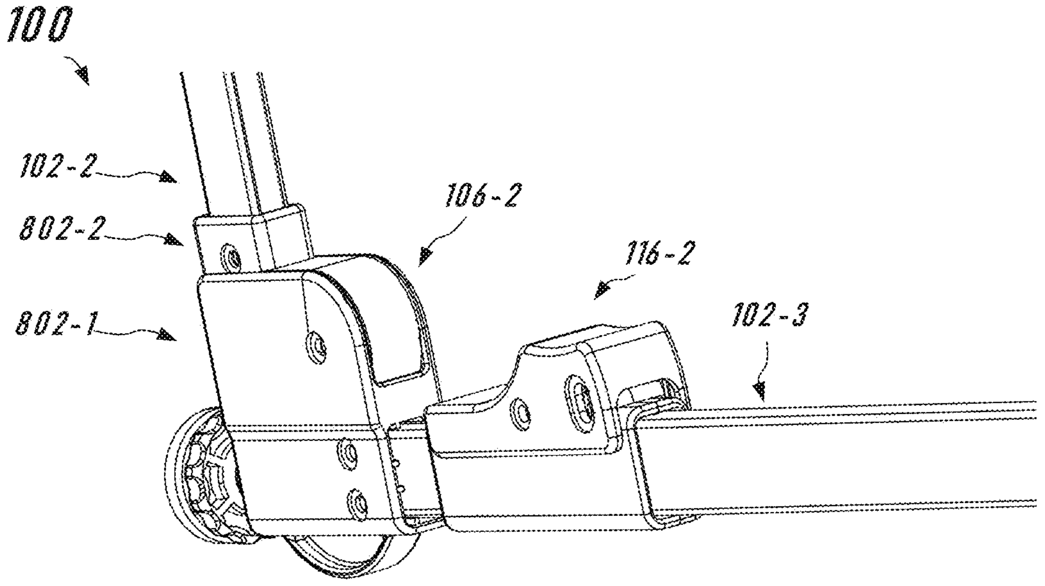
FIG. 8 shows another example hinged coupler for use by the frame of FIG. 2.

Likewise, FIG. 8 shows an example of the hinged coupler 106-2. As shown, the hinged coupler 106-2 includes first and second body portions 802-1, 802-2, respectively, which are configured to rotate relative to each other. Likewise, The first and second body portions 802-1, 802-2 each include openings at an end to couple to respective frame members as shown.

Continuing with FIGS. 1-5, the first rotational axis 118 defined by the hinged couplers 104-1, 104-2 allows for the frame members on either side of each of the hinged couplers 104-1, 104-2 to rotate relative to each other about the first rotational axis 118, and thus by extension, rotate the hinged couplers 106-1, 106-2, towards each other in a clam-shell fashion. The first rotational axis 118 may also be referred to herein as a common (or concentric) rotational axis. The sliding locks 114-1, 1-14-2, can be spring loaded and can allow a user to disengage the locks to allow for the first and second hinged couplers 104-1, 104-2 to rotate and transition the gate 100 to the storage configuration.

Accordingly, the rotational axis 118 of the hinged couplers 104-1, 104-2 allows for the gate 100 to be folded substantially in half to bring the first and second frame members 102-1, 102-2, substantially in parallel with each other, and likewise, the second and third frame members 102-2, 102-3 substantially in parallel with each other. Stated differently, the gate 100 includes a clamshell hinge arrangement based on hinged couplers 104-1, 104-2 providing a continuous/common hinge that extends along the first rotational axis 118 to allow for bifurcation of the gate 100 into two (substantially equal) portions that can be joined or at least brought in close proximity with each other. To this end, and for simplicity, the first and second hinged couplers 104-1, 104-2 may be referred to as first and second clamshell hinges. One example of the gate 100 folded into this intermediate storage position is shown in FIG. 4.

On the other hand, each of the hinged couplers 106-1, 106-2 allow for rotation about a second rotational axis 120. The second rotational axis 120 extends substantially transverse relative to the first rotational axis 118 and also extends substantially transverse relative to the plane in which the gate 100 extends when in the in-use configuration. Accordingly, the hinged couplers 106-1 and 106-2 each define a hinge joint or pivot joint to allow for their associated frame members to pivot and rotate about the second rotational axis 120 towards each other. Thus, each of the hinged couplers 106-1 and 106-2 may also be referred to herein as first and second pivot hinges.

However, it should be noted that each of the hinged couplers 106-1, 106-2 are preferably "locked" and prevent rotation when the gate 100 is in the in-use configuration as is shown in FIG. 3, for instance. Such locking is based on the first and second hinged couplers 106-1, 106-2 having non-concentric/non-collinear rotational axis. Although the second rotational axis 120 extends coaxially from both the first and second hinged couplers hinges 106-1, 106-2, rotation along that axis is limited/prevented as the first and second hinged couplers 104-1, 104-2 securely hold their associated frame members in position, which is to say substantially transverse relative to each other, therefore "locking" the first and second hinged couplers 106-1, 106-2. Thus, the gate 100 can advantageously lock the hinged couplers 106-1, 106-2 when in the in-use configuration.

Figure 4:
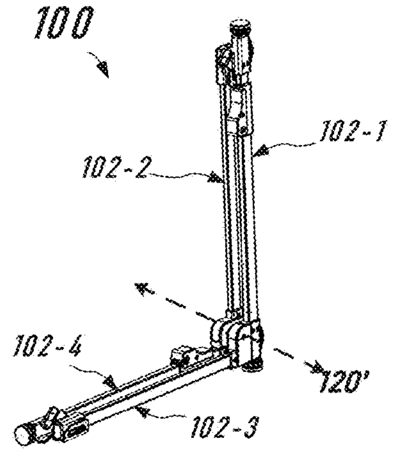
FIG. 4 shows a perspective view of the frame of FIG. 2 in a partially folded configuration in accordance with an embodiment of the present disclosure.

On the other hand, when the gate frame 102 of the gate 100 is transitioned to the folded/intermediate storage configuration as shown in the example embodiment of FIG. 4, the hinged couplers 106-1 and 106-2 then preferably concentrically align based on rotation of the first and second hinged couplers 104-1, 104-2 such that each can rotate about a common, concentric/collinear rotational axis 120'. In response to such alignment, the hinged couplers 106-1 and 106-2 preferably only then, e.g., only after rotational movement of the first and second hinged couplers 104-1, 104-2, allow the first and second frame members 102-1, 102-2 to rotate about the rotational axis 120' relative to the third and fourth frame members 102-3, 102-4 to transition from the intermediate storage configuration to the storage configuration. This rotation then results in the hinged couplers 106-1, 106-2 being brought adjacent each other. One example of the gate 100 in the storage configuration is shown in the example embodiment of FIG. 5.

Figure 5:
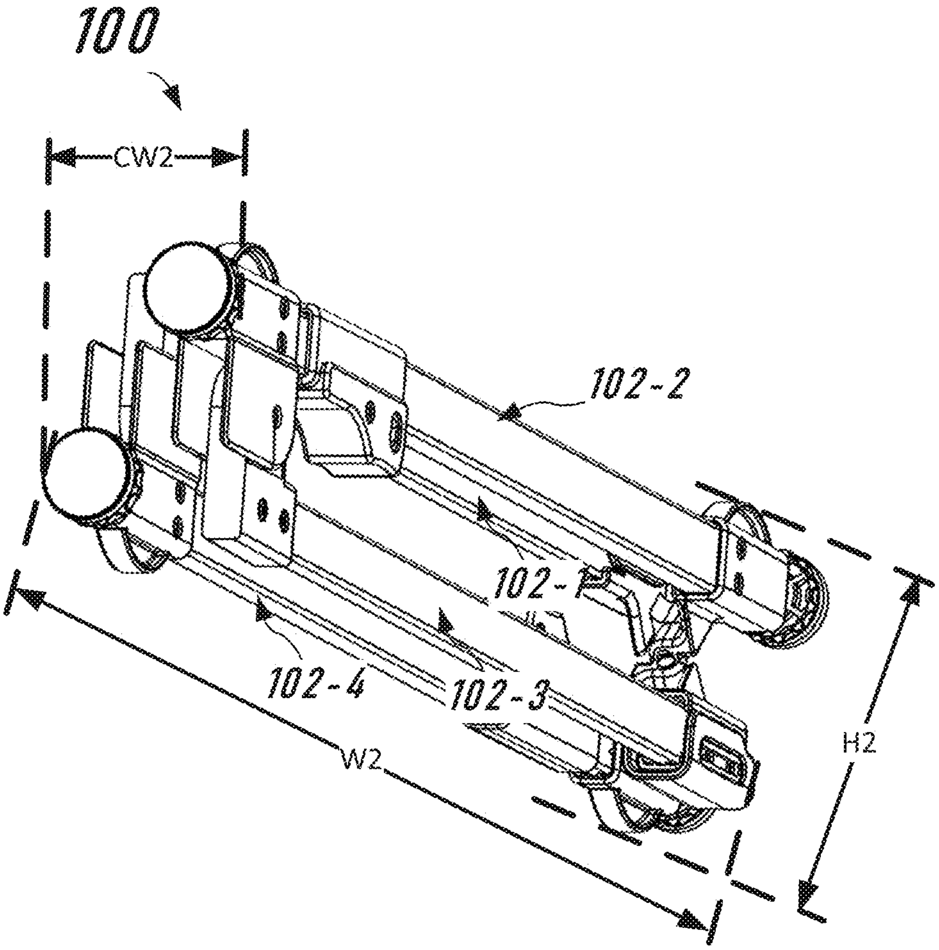
FIG. 5 shows the frame of FIG. 2 in a storage configuration, in accordance with an embodiment of the present disclosure.

Turning again to the example embodiment of FIG. 5, the storage configuration of the gate 100 includes each of the frame members of the gate frame 102 extending parallel relative to each other to provide a compact footprint. The fabric sidewall 108, although not shown in FIGS. 3-5, can remain attached to the gate 100 when transitioning the gate 100 to the storage configuration. In this scenario, the fabric sidewall 108 preferably bends/folds during the transition from the in-use to the intermediate configuration, and then to the full storage/folded configuration, and can simply occupy the interstitial space between the parallel frame members.

Figure 7:
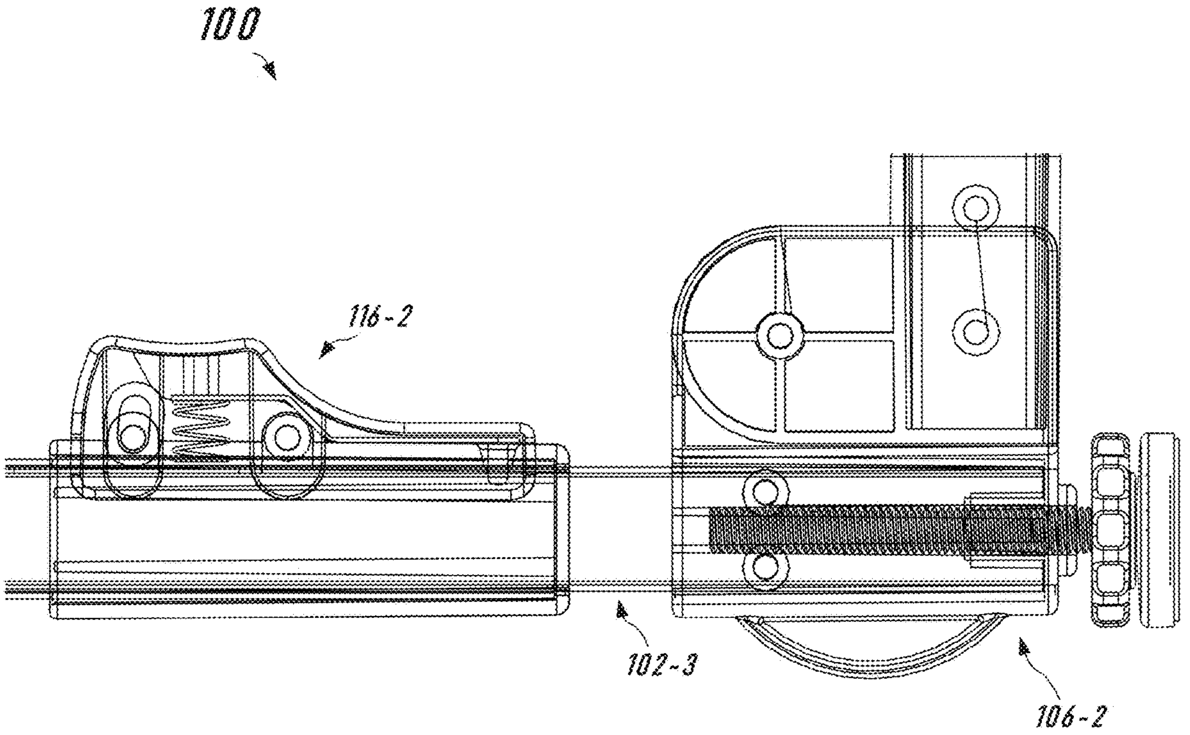
FIG. 7 shows an example locking mechanism for use by the frame of FIG. 2, in accordance with an embodiment of the present disclosure.

FIG. 7 shows an example cross-sectional view of the frame lock 116-2 and the hinged coupler 106-2. As shown, the frame lock 116-2 includes a spring and detent mechanism to allow a user-supplied pressure to disengage the lock to extend the frame members, e.g., via telescoping frame member 102-3. FIG. 8 shows the example hinged coupler 106-2 and frame lock 116-2 when the gate 100 is in the in-use configuration.

Figure 9:
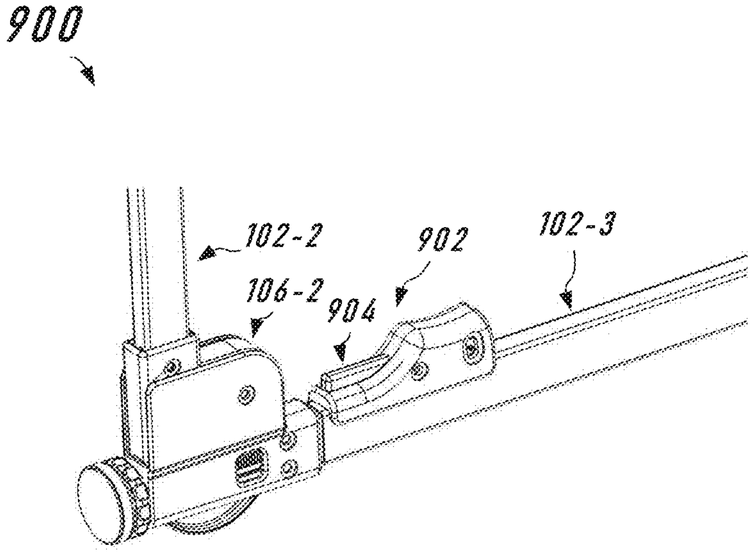
FIG. 9 shows another example hinged coupler for use by the frame of FIG. 2.

FIG. 9 shows an example embodiment 900 that includes the telescoping frame member 102-3 having a push-button frame lock 902. A safety gate consistent with the present disclosure can utilize such push-button frame locks as an alternative to the frame locks 116-1, 116-2. In this embodiment, the push-button frame locks 902 allow for the telescoping frame members, e.g., 102-1, 102-3 (FIG. 2), to extend/collapse to adjust the overall width of the gate, as discussed above.

The push-button frame locks 902 can utilize a detent mechanism similar to that of the frame locks 116-1, 116-2, the description of which will not be repeated for brevity. However, the push-button portion of the push-bottom frame lock 902 can utilize, for instance, a spring bias that changes the tactile 'feel' of the button 904 in response to whether the gate is in a storage or in-use configuration. For instance, as discussed above the frame includes extendable sections 103-1, 103-2 that corresponds with frame members 102-1 and 102-3, respectively. The push-bottom frame lock 902 can work in conjunction with the extendable sections and engage one or more detent positions as the gate transitions from the storage to in-use configuration. In response to extending the gate to one or more of the detent positions, the button 904 may indicate a 'locked' position based on a spring force that gets applied to the button 904 in response to encountering the detent. This spring force can cause the button 904 to protrude from the push-button frame lock 902 so that a user can easily locate and manipulate the same through, for instance, a fabric covering.

In use, a user may therefore run their fingers along the fabric/material surrounding the frame member 102-3 until their hand encounters the button 904 to displace/push the same and 'unlock' the extendable sections. The curved profile and contours of the push-button frame lock 902 allows for one or more fingers to comfortably grip the same while one or more other fingers are used to apply force on to the button 904. When two or more locks are utilized, a user can simply grip each push-button frame lock and engage the locks and allow gravity to draw/collapse the extendable sections 103-1, 103-2 (FIG. 2) into each other, for example.

In accordance with an aspect of the present disclosure a gate device to extend across a passageway is disclosed. The gate device comprises a plurality of frame members, a plurality of hinged couplers to couple the frame members together to provide a gate frame and transition the gate frame from an in-use configuration to a storage configuration, each hinged coupler of the plurality of hinged couplers having first and second body portions rotatably coupled to each other, and wherein the hinged couplers transition the gate frame from the in-use configuration to the storage configuration based on at least a first hinged coupler of the plurality of hinged couplers having respective first and second body portions being configured to rotate relative to each other about a first axis of rotation, and at least a second hinged coupler of the plurality of hinged couplers having respective first and second body portions being configured to rotate relative to each other about a second axis of rotation, the first and second axis of rotation being substantially transverse relative to each other.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. It will be appreciated by a person skilled in the art that a gate consistent with the present disclosure may embody any one or more of the features contained herein and that the features may be used in any particular combination or sub-combination. Modifications and substitutions by one of ordinary skill in the art are considered to be within the scope of the present disclosure, which is not to be limited except by the claims.

What is claimed is:

1. A gate device to extend across a passageway, the gate device comprising:

a plurality of frame members;

a plurality of hinged couplers to couple the frame members together to provide a gate frame and transition the gate frame from an in-use configuration wherein the frame members reside in a common plane in which the gate extends to a storage configuration, each hinged coupler of the plurality of hinged couplers having first and second body portions rotatably coupled to each other; and wherein the hinged couplers transition the gate frame from the in-use configuration to the storage configuration based on at least a first hinged coupler of the plurality of hinged couplers having the first and second body portions being configured to rotate relative to each other about a first axis of rotation positioned outside of the common plane, and at least a second hinged coupler of the plurality of hinged couplers having the first and second body portions being configured to rotate relative to each other about a second axis of rotation intersecting the common plane and at an interior of the gate frame, the first and second axis of rotation being substantially transverse relative to each other.

2. The gate device of claim 1, wherein the gate frame has a first minimum overall width W1 and a first overall height H1 in the in-use configuration, and a second overall width W2 and a second overall height H2 in the storage configuration, the second overall width W2 being substantially equal to the first minimum overall width W1, and the second overall height H2 being less than the first overall height H1.

3. The gate device of claim 2, wherein the second overall height H2 of the gate frame in the storage configuration is 50±10% less than the first overall height H1 of the gate frame in the in-use configuration.

4. The gate device of claim 1, wherein the plurality of frame members forming the gate frame include at least four frame members, and wherein the at least four frame members extend substantially parallel with each other in the storage configuration.

5. The gate device of claim 1, further comprising a fabric material at least partially surrounding the plurality of frame members.

6. The gate device of claim 5, wherein the fabric material comprises cotton, vinyl, polyester, nylon, acrylic and/or olefin.

7. The gate device of claim 1, wherein the plurality of hinged couplers include a first pair of hinged couplers configured to be disposed diagonally from each other when the gate frame is in the in-use configuration, and a second pair of hinged couplers configured to be disposed diagonally from each other when the gate frame is in the in-use configuration, the first pair of hinged couplers including the first hinged coupler and the second pair of hinged couplers including the second hinged coupler.

8. The gate device of claim 7, wherein each of the first pair of hinged couplers include the first and second body portions configured to rotate about the first axis of rotation and the second pair of hinged couplers include the first and second body portions configured to rotate about the second axis of rotation.

9. The gate device of claim 8, wherein the first pair of hinged couplers are configured to rotate about the first axis of rotation to allow the second pair of hinged couplers to be positioned parallel to each other to transition the gate frame from the in-use configuration to the storage configuration.

10. The gate device of claim 9, wherein the second pair of hinged couplers are configured to rotate about the second rotational axis only after the first pair of hinged couplers rotate about the first axis of rotation and bring the second pair of hinged couplers adjacent each other.

11. The gate device of claim 1, wherein at least one hinged coupler of the plurality of hinged couplers couples to a first frame member of the plurality of frame members via the first body portion and a second frame member of the plurality of frame members via the second body portion, and wherein the first and second body portions cause the first and second frame members to couple thereto, respectively, to extend at substantially 90 degrees relative to each other when the gate frame is in the in-use configuration.

12. The gate device of claim 1, wherein the first body portion of the first hinged coupler is coupled to a first end of one of the plurality of frame members and the first body portion of the second hinged coupler is coupled to a second end of the one of the plurality of frame members and the first body portion of the first hinged coupler and the first body portion of the second hinged coupler include respective openings for receiving associated extending pressure members, the associated extending pressure members each being configured to adjustably extend outwardly from the frame.

* * * * *